(12) United States Patent
Kanaoka et al.

(10) Patent No.: US 7,030,206 B2
(45) Date of Patent: Apr. 18, 2006

(54) POLYMER ELECTROLYTE AND PROTON-CONDUCTING MEMBRANE

(75) Inventors: Nagayuki Kanaoka, Tochigi-ken (JP); Masaru Iguchi, Tokyo (JP); Naoki Mitsuta, Tochigi-ken (JP); Hiroshi Sohma, Tochigi-ken (JP); Toshihiro Ohtsuki, Chiba (JP)

(73) Assignees: Honda Motor Co., Ltd., Tokyo (JP); JSR Corporation, Tokyo (JP)

( * ) Notice: Subject to any disclaimer, the term of this patent is extended or adjusted under 35 U.S.C. 154(b) by 11 days.

(21) Appl. No.: 10/804,228

(22) Filed: Mar. 19, 2004

(65) Prior Publication Data

US 2004/0214065 A1 Oct. 28, 2004

(30) Foreign Application Priority Data

| | | | |
|---|---|---|---|
| Mar. 19, 2003 | (JP) | | 2003-076192 |
| Mar. 19, 2003 | (JP) | | 2003-076193 |
| Mar. 19, 2003 | (JP) | | 2003-076194 |
| Mar. 25, 2003 | (JP) | | 2003-081768 |

(51) Int. Cl.
*C08G 73/06* (2006.01)
*C08G 75/00* (2006.01)
*H01M 8/00* (2006.01)

(52) U.S. Cl. .............. 528/171; 528/125; 528/128; 528/170; 528/220; 528/226; 528/228; 528/230; 528/327; 528/373; 528/391; 429/32; 429/33; 429/314

(58) Field of Classification Search ............ 528/125, 528/170, 373, 390, 128, 171, 220, 226, 228, 528/230, 327, 391; 429/32–33, 314
See application file for complete search history.

(56) References Cited

U.S. PATENT DOCUMENTS

| | | | | |
|---|---|---|---|---|
| 4,906,724 A | * | 3/1990 | Yamanaka et al. | 528/193 |
| 5,403,675 A | * | 4/1995 | Ogata et al. | 429/33 |
| 6,555,626 B1 | | 4/2003 | Goto et al. | |
| 6,586,561 B1 | * | 7/2003 | Litt et al. | 528/353 |
| 6,632,847 B1 | * | 10/2003 | Soczka-Guth et al. | 521/27 |
| 6,770,393 B1 | * | 8/2004 | Akita et al. | 429/33 |
| 6,825,310 B1 | * | 11/2004 | Goto et al. | 528/86 |
| 6,926,984 B1 | * | 8/2005 | Asano et al. | 429/32 |
| 6,933,003 B1 | * | 8/2005 | Yan | 427/115 |
| 6,939,646 B1 | * | 9/2005 | Shinoda et al. | 429/314 |
| 6,949,616 B1 | * | 9/2005 | Jacob et al. | 528/32 |
| 2002/0172850 A1 | | 11/2002 | Asano et al. | |
| 2002/0177658 A1 | | 11/2002 | Goto et al. | |
| 2002/0188097 A1 | | 12/2002 | Goto et al. | |

FOREIGN PATENT DOCUMENTS

| | | | |
|---|---|---|---|
| EP | 1 138 712 A2 | | 10/2001 |
| EP | 1 274 147 A2 | | 1/2003 |
| EP | 1 354 907 A1 | | 10/2003 |
| JP | 2001-251818 | | 9/2001 |
| JP | 2002-313366 | | 10/2002 |
| JP | 2002-358978 | | 12/2002 |
| JP | 2002-367629 | | 12/2002 |
| JP | 2002-373674 | | 12/2002 |
| JP | 2003-055457 | * | 2/2003 |
| JP | 2003-147074 | * | 5/2003 |
| JP | 2005-166557 | * | 6/2005 |
| WO | WO 94/24717 | | 10/1994 |

OTHER PUBLICATIONS

O. Savadogo, " Emerging Membranes for Electrochemical Systems: (1)Solid Polymer Electrolyte Membranes for Fuel Cell Systems," Journal of New Materials for Electrochemical Systems, Ecole Polytechnique De Montreal, Montreal, Canada, vol. 1, 1998, pp. 47-66.

* cited by examiner

*Primary Examiner*—P. Hampton Hightower
(74) *Attorney, Agent, or Firm*—Arent Fox, PLLC.

(57) ABSTRACT

To provide a sulfonic acid group-containing polymer having improved hot water resistance and radical resistance (durability), a solid polymer electrolyte including the polymer, and a proton-conducting membrane including the electrolyte, the polymer electrolyte includes a sulfonated product of a polymer shown by the following general formula (I):

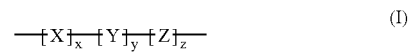

(I)

wherein X, Y, and Z are bonded randomly, alternately, or in blocks, y represents an integer of two or more, and each of x and z represents an integer of zero or more, where $x+z>2$.

11 Claims, No Drawings

POLYMER ELECTROLYTE AND PROTON-CONDUCTING MEMBRANE

Japanese Patent Application Nos. 2003-76192, 2003-76193, and 2003-76194, filed on Mar. 19, 2003, and Japanese Patent Application No. 2003-81768, filed on Mar. 25, 2003, are hereby incorporated by reference in their entirety.

BACKGROUND OF THE INVENTION

The present invention relates to a solid polymer electrolyte comprising a sulfonic acid group-containing polymer excelling in oxidation resistance, hot water resistance, and the like which is used for fuel cells, water electrolysis, salt electrolysis, humidity sensors, gas sensors, and the like, and to a proton-conducting membrane comprising the electrolyte.

A solid polymer electrolyte is a solid polymer material including an electrolyte group such as a sulfonic acid group or a carboxylic acid group in the polymer chain. Since the solid polymer electrolyte has properties of strongly bonding to a specific ion or selectively allowing a cation or anion to permeate therethrough, the solid polymer electrolyte is utilized as a polymer electrolyte membrane for polymer electrolyte fuel cells or water electrolysis cells.

In a polymer electrolyte fuel cell, a pair of electrodes is provided, with one on each side of a proton-conducting solid polymer electrolyte membrane. Pure hydrogen or reformed hydrogen gas is supplied to one electrode (fuel electrode) as fuel gas, and oxygen gas or air is supplied to the other electrode (air electrode) as an oxidizing agent to obtain electromotive force. In water electrolysis, hydrogen and oxygen are produced by electrolyzing water by using a solid polymer electrolyte membrane to cause the reverse reaction of the fuel cell reaction to occur.

However, a side reaction occurs in the fuel cell or water electrolysis in addition to the main reaction. A typical side reaction is generation of hydrogen peroxide ($H_2O_2$). A radical species originating in hydrogen peroxide causes the solid polymer electrolyte membrane to deteriorate.

As the solid polymer electrolyte membrane, a perfluorosulfonic acid membrane commercially available under the trade name of NAFION (registered trademark, manufactured by DuPont), ACIPLEX (registered trademark, manufactured by Asahi Kasei Corporation), or FLEMION (registered trademark, manufactured by Asahi Glass Co., Ltd.) has been used because of its chemical stability.

However, since the perfluorosulfonic acid electrolyte membrane is very expensive due to the difficulty in manufacture, its applications are limited to special uses. This hinders applications to commercial uses such as automotive and domestic fuel cells. Moreover, since the perfluorosulfonic acid electrolyte membrane contains a large number of fluorine atoms in the molecule, disposal after use poses serious environmental problems.

Therefore, as a less expensive solid polymer electrolyte membrane containing no fluorine atom, a polymer produced by sulfonating the main-chain aromatic ring of polyether ether ketone, polyether sulfone, or polyphenylene sulfide has been proposed. However, the polymer in which the main-chain aromatic ring is sulfonated not only has inferior hot water resistance due to high water absorption, but also has inferior Fenton resistance (radical resistance) which is considered to be the measure of power generation durability.

BRIEF SUMMARY OF THE INVENTION

An objective of the present invention is to solve the problems of the aromatic hydrocarbon electrolyte membrane which has been conventionally studied, and to provide a solid polymer electrolyte comprising a sulfonic acid group-containing polymer with improved hot water resistance and radical resistance (durability), and a proton-conducting membrane comprising the electrolyte.

According to one aspect of the present invention, there is provided a polymer electrolyte comprising a sulfonated product of a polymer shown by the following general formula (I):

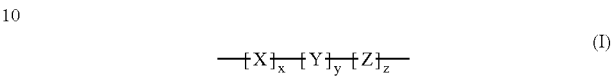

wherein X represents at least one structure selected from structures shown by the following formulas (X-1), (X-2), and (X-3), Y represents at least one structure selected from structures shown by the following formulas (Y-1) to (Y-12), Z represents at least one structure selected from structures shown by the following formulas (Z-1) and (Z-2), X, Y, and Z being bonded randomly, alternately, or in blocks, y represents an integer of two or more, and each of x and z represents an integer of zero or more, where x+z>2,

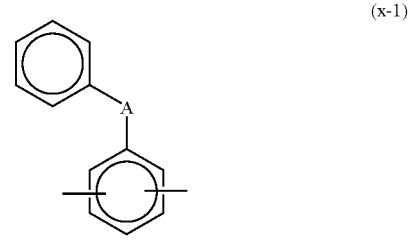

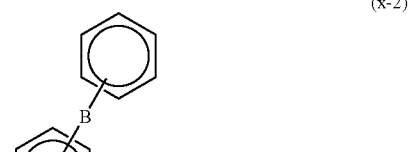

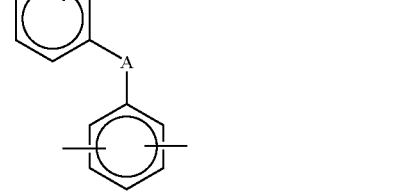

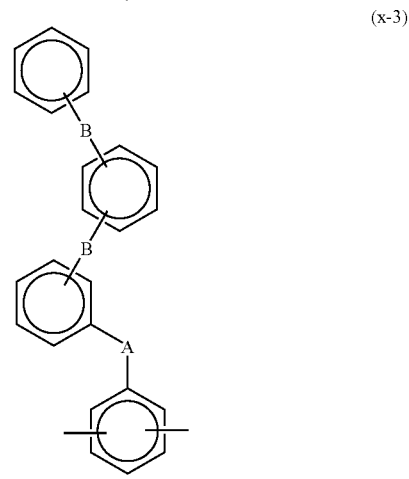

wherein A represents an electron-withdrawing group, and B represents an electron-donating group,

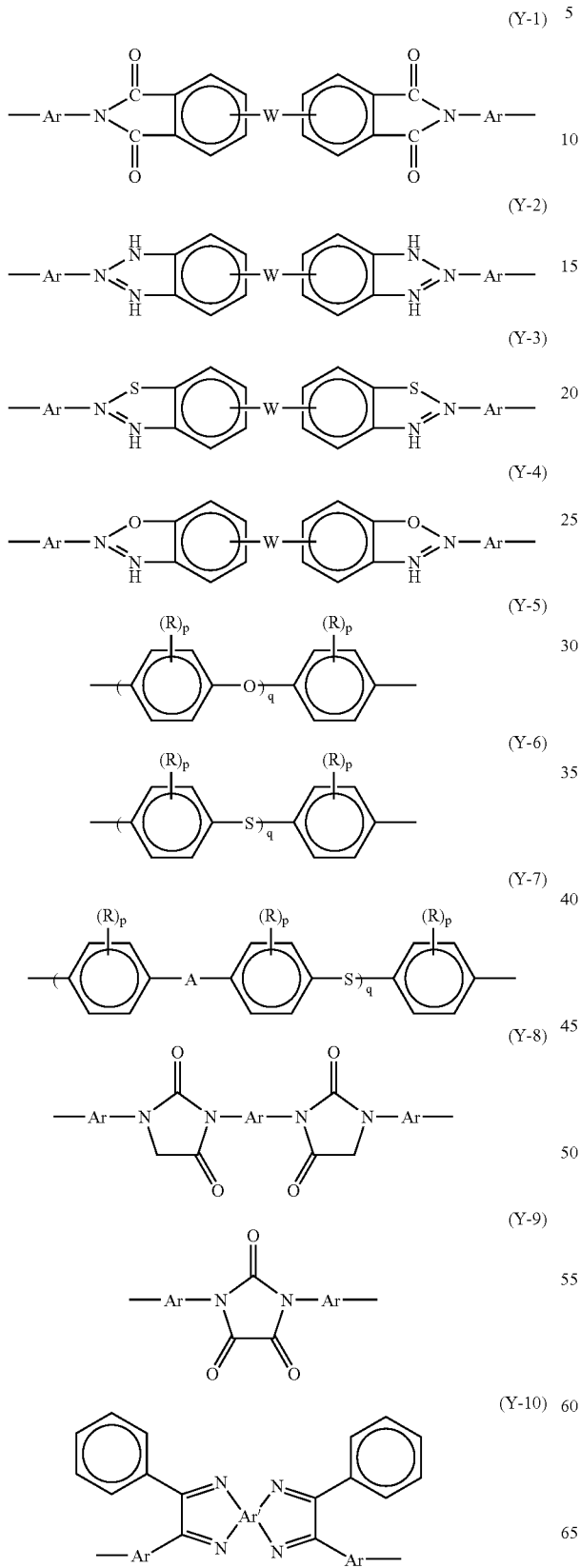

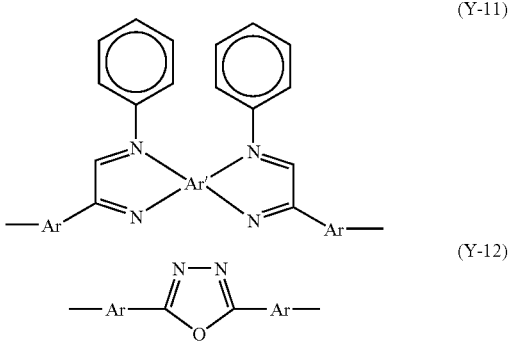

wherein A represents an electron-withdrawing group, Ar represents a divalent group including an aromatic ring, Ar' represents a tetravalent group including an aromatic ring, R represents a hydrogen atom or a hydrocarbon group, W represents an electron-withdrawing group or an electron-donating group, p represents an integer of 0 to 4, and q represents an integer of 1 to 1000,

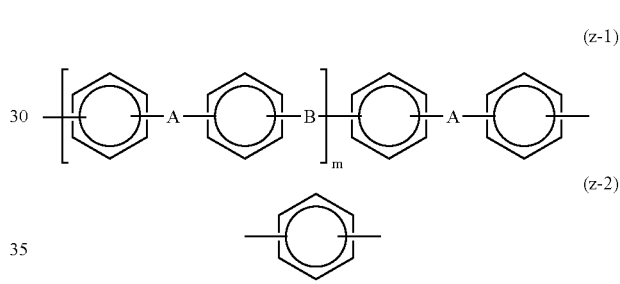

wherein A represents an electron-withdrawing group, B represents an electron-donating group, and m represents an integer of 0 to 200.

The polymer electrolyte may comprise a sulfonated product of a polymer shown by the following general formula (1):

wherein X represents at least one structure selected from the structures shown by the formulas (X-1), (X-2), and (X-3), Y represents at least one structure selected from the structures shown by the formulas (Y-1) to (Y-12), X and Y being bonded randomly, alternately, or in blocks, and each of x and y represents an integer of two or more.

The polymer electrolyte may comprise a sulfonated product of a polymer shown by the following general formula (2):

wherein X represents at least one structure selected from the structures shown by the formulas (Y-1) to (Y-12), Z represents at least one structure selected from the structures shown by the formulas (Z-1) and (Z-2), Y and Z being bonded randomly, alternately, or in blocks, and each of y and z represents an integer of two or more.

The polymer electrolyte may comprise a sulfonated product of a polymer shown by the following general formula (3):

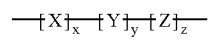
(3)

wherein X represents at least one structure selected from the structures shown by the formulas (X-1), (X-2), and (X-3), Y represents at least one structure selected from the structures shown by the formulas (Y-1) to (Y-12), Z represents at least one structure selected from the structures shown by the formulas (Z-1) and (Z-2), X, Y, and Z being bonded randomly, alternately, or in blocks, and each of x, y, and z represents an integer of two or more.

The polymer electrolyte may comprise a sulfonic acid group in an amount of 0.5 to 3.0 meq/g.

According to another aspect of the present invention, there is provided a proton-conducting membrane comprising any of the above described polymer electrolyte.

According to a further aspect of the present invention, there is provided a membrane electrode assembly comprising a pair of electrodes and an electrolyte membrane held between the electrodes, the electrodes and the electrolyte membrane being integrally bonded, wherein the electrolyte membrane comprises a polymer shown by the general formula (I).

DETAILED DESCRIPTION OF THE EMBODIMENT

Polymer

The polymer which composes the polymer electrolyte of the present invention is described below.

The polymer which composes the polymer electrolyte of the present invention is a sulfonated product of the polymer shown by the general formula (I). In the general formula (I), X represents at least one structure selected from the structures shown by the formulas (X-1), (X-2), and (X-3), Y represents at least one structure selected from the structures shown by the formulas (Y-1) to (Y-12), and Z represents at least one structure selected from the structures shown by the formulas (Z-1) and (Z-2).

As the polymer shown by the formula (I), the polymers shown by the general formulas (1), (2), and (3) can be given. In the general formulas (1), (2), and (3), X, Y, and Z are bonded randomly, alternately, or in blocks, and each of x, y, and z represents an integer of two or more.

In (X-1), (X-2), (X-3), (Y-7) and (Z-1) of the general formula (I), as the electron-withdrawing group represented by A, —CO—, —SO$_2$—, —SO—, —CONH—, —COO—, —(CF$_2$)$_p$— (wherein p represents an integer of 1 to 10), —C(CF$_3$)$_2$—, and the like can be given.

In (X-2), (X-3), and (Z-1) of the general formula (I), as the electron-donating group represented by B, —(CH$_2$)—, —C(CH$_3$)$_2$—, —O—, —S—, and the like can be given.

In (Y-1), (Y-2), (Y-3), (Y-4), (Y-8), (Y-9), (Y-10), (Y-11), and (Y-12) of the general formula (I), as the aromatic ring included in Ar and Ar', a benzene ring, biphenyl ring, naphthalene ring, and the like can be given. In this case, a hydrogen atom on the aromatic ring may be replaced by a halogen atom or the like.

In (Y-1), (Y-2), (Y-3), and (Y-4) of the general formula (I), as the electron-withdrawing group or the electron-donating group represented by W, —CO—, —SO$_2$—, —SO—, —CONH—, —COO—, —(CF$_2$)$_p$— (wherein p represents an integer of 1 to 10), —C(CF$_3$)$_2$—, —(CH$_2$)—, —C(CH$_3$)$_2$—, —O—, —S—, and the like can be given.

In (Y-5), (Y-6), and (Y-7) of the general formula (I), as the hydrocarbon group represented by R, an alkyl group such as a methyl group, ethyl group, propyl group, butyl group, and hexyl group, and an alkenyl group or an alkynyl group having 1 to 6 carbon atoms can be given. p represents an integer of 0 to 4, and q represents 0 to 1000. The hydrocarbon group represented by R may be fluorinated, and may be a perfluoroalkyl group such as a trifluoromethyl group or a pentafluoromethyl group.

In the present invention, the electron-withdrawing group refers to a group having a Hammett substituent constant of 0.06 or more at the meta position of a phenyl group and 0.01 or more at the para position of a phenyl group.

The polystyrene-reduced weight average molecular weight of the polymer shown by the general formula (I) is usually 10,000 to 1,000,000.

The polymer electrolyte of the present invention is obtained by sulfonating the polymer shown by the general formula (I) by using a sulfonating agent. The sulfonating agent and the sulfonation method are described later.

Method of Producing Polymer

The polymer shown by the general formula (1) is obtained by polymerizing at least one monomer selected from monomers shown by the following general formulas (X-1)', (X-2)', and (X-3)' (hereinafter called "monomer X") and at least one monomer selected from monomers shown by the following general formulas (Y-1)', (Y-2)', (Y-3)', (Y-4)', (Y-5)', (Y-6)', (Y-7)', (Y-8)', (Y-9)', (Y-10)', (Y-11)', and (Y-12)' (hereinafter called "monomer Y").

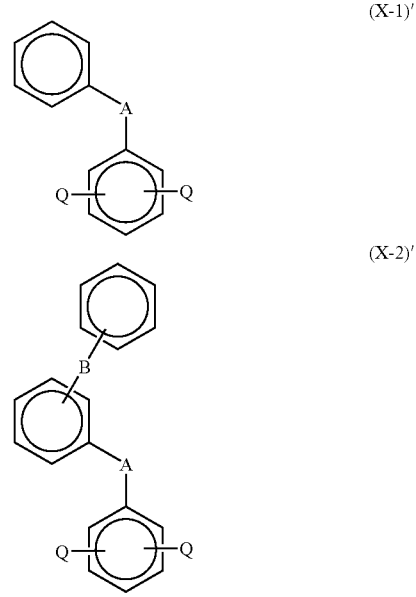

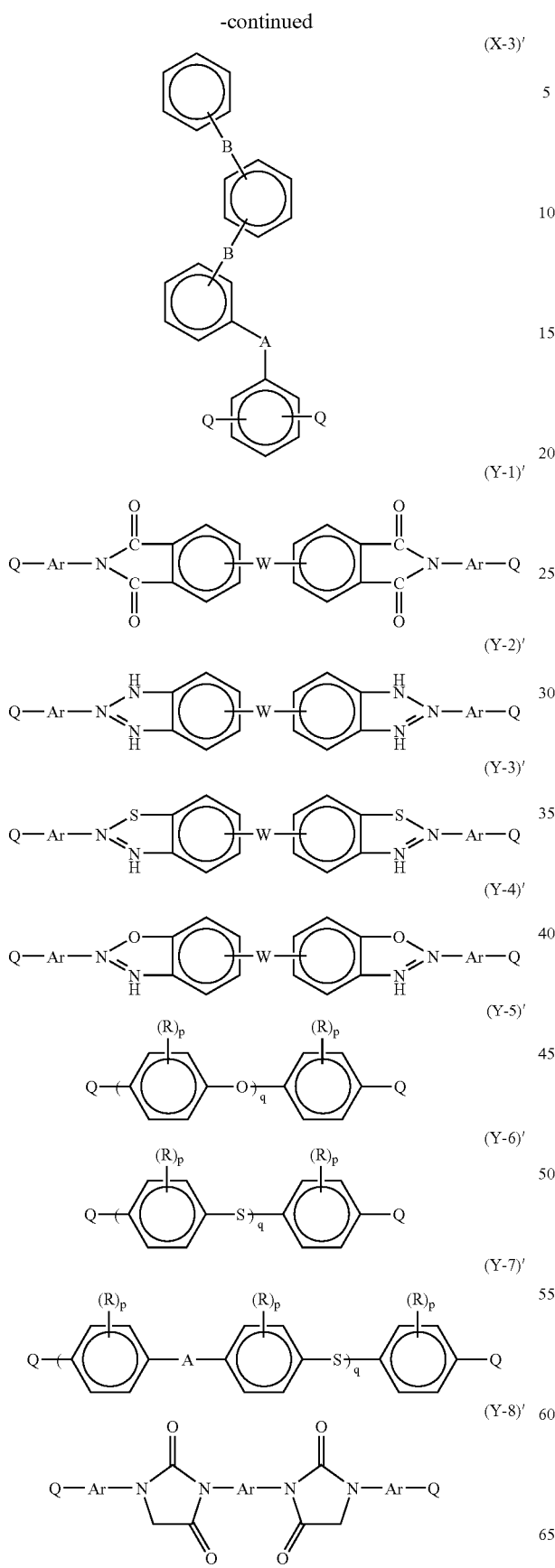
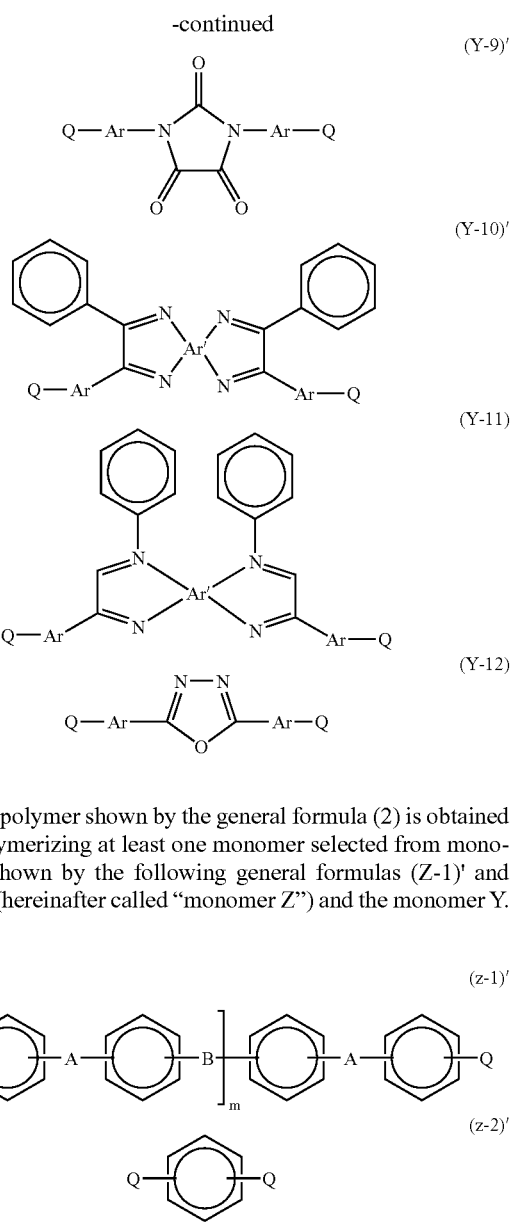

The polymer shown by the general formula (2) is obtained by polymerizing at least one monomer selected from monomers shown by the following general formulas (Z-1)' and (Z-2)' (hereinafter called "monomer Z") and the monomer Y.

The polymer shown by the general formula (3) is obtained by polymerizing the monomer X, the monomer Y, and the monomer Z.

In the general formulas (X-1)' to (Z-2)', Q represents a halogen atom excluding a fluorine atom or a group shown by —OSO$_2$D (wherein D represents an alkyl group, fluorine-substituted alkyl group, or an aryl group).

As the alkyl group represented by D, a methyl group, an ethyl group, and the like can be given. As the fluorine-substituted alkyl group represented by D, a trifluoromethyl group and the like can be given. As the aryl group represented by D, a phenyl group, a p-tolyl group, and the like can be given.

In the formulas (X-1)' to (X-3)', (Y-7)', and (Z-1)', A and B are the same as defined for the formulas (X-1) to (X-3), (Y-7), and (Z-1). In the formulas (Y-1)' to (Y-4)' and (Y-8)' to (Y-12)', Ar, Ar', and W are the same as defined for the formulas (Y-1) to (Y-4) and (Y-8) to (Y-12).

In the formulas (Y-5)' to (Y-7)', R is the same as defined for the formulas (Y-5) to (Y-7).

The polymer shown by the general formula (I) is obtained by reacting the above monomers in the presence of a catalyst. The catalyst is a catalyst system including a transition metal compound. The catalyst system includes, as essential components, (i) a transition metal salt and a compound which becomes a ligand (hereinafter called "ligand component") or a ligand-coordinated transition metal complex (including cuprate), and (ii) a reducing agent. A salt may be added to the catalyst system in order to increase the polymerization rate.

As the transition metal salt, nickel compounds such as nickel chloride, nickel bromide, nickel iodide, and nickel acetylacetonate; palladium compounds such as palladium chloride, palladium bromide, and palladium iodide; iron compounds such as ferrous chloride, ferrous bromide, and ferrous iodide; cobalt compounds such as cobalt chloride, cobalt bromide, and cobalt iodide; and the like can be given. Of these, nickel chloride and nickel bromide are desirable.

As the ligand component, triphenylphosphine, 2,2'-bipyridine, 1,5-cyclooctadiene, 1,3-bis(diphenylphosphino)propane, and the like can be given. Of these, triphenylphosphine and 2,2'-bipyridine are desirable. The compound as the ligand component may be used either individually or in combination of two or more.

As the ligand-coordinated transition metal complex, bis(triphenylphosphine)nickel chloride, bis(triphenylphosphine)nickel bromide, bis(triphenylphosphine)nickel iodide, bis(triphenylphosphine)nickel nitrate, (2,2'-bipyridine)nickel chloride, (2,2'-bipyridine)nickel bromide, (2,2'-bipyridine)nickel iodide, (2,2'-bipyridine)nickel nitrate, bis(1,5-cyclooctadiene)nickel, tetrakis(triphenylphosphine)nickel, tetrakis(triphenylphosphite)nickel, tetrakis(triphenylphosphine)palladium, and the like can be given. Of these, bis(triphenylphosphine)nickel chloride and (2,2'-bipyridine)nickel chloride are desirable.

As the reducing agent (ii) which can be used in the catalyst system, iron, zinc, manganese, aluminum, magnesium, sodium, calcium, and the like can be given. Of these, zinc, magnesium, and manganese are desirable. The reducing agent may be used in a further activated state by contacting the reducing agent with an acid such as an organic acid.

As the salt which can be used in the catalyst system, sodium compounds such as sodium fluoride, sodium chloride, sodium bromide, sodium iodide, and sodium sulfate; potassium compounds such as potassium fluoride, potassium chloride, potassium bromide, potassium iodide, and potassium sulfate; ammonium compounds such as tetraethylammonium fluoride, tetraethylammonium chloride, tetraethylammonium bromide, tetraethylammonium iodide, and tetraethylammonium sulfate; and the like can be given. Of these, sodium bromide, sodium iodide, potassium bromide, tetraethylammonium bromide, and tetraethylammonium iodide are desirable.

The transition metal salt or transition metal complex is used in an amount of usually 0.0001 to 10 mol, and desirably 0.01 to 0.5 mol for one mol of the monomers in total. If the amount is less than 0.0001 mol, polymerization may not sufficiently proceed. If the amount exceeds 10 mol, the molecular weight of the polymer may be decreased.

In the case of using the transition metal salt and the ligand component in the catalyst system, the ligand component is used in an amount of usually 0.1 to 100 mol, and desirably 1 to 10 mol for one mol of the transition metal salt. If the amount is less than 0.1 mol, the catalytic activity may be insufficient. If the amount exceeds 100 mol, the molecular weight may be decreased.

The reducing agent is used in an amount of usually 0.1 to 100 mol, and desirably 1 to 10 mol for one mol of the monomers in total. If the amount is less than 0.1 mol, polymerization may not sufficiently proceed. If the amount exceeds 100 mol, purification of the resulting polymer may become difficult.

In the case of using the salt, the salt is used in an amount of usually 0.001 to 100 mol, and desirably 0.01 to 1 mol for one mol of the monomers in total. If the amount is less than 0.001 mol, the effect of increasing the polymerization rate may be insufficient. If the amount exceeds 100 mol, purification of the resulting polymer may become difficult.

As a polymerization solvent which can be used, tetrahydrofuran, cyclohexanone, dimethylsulfoxide, N,N-dimethylformamide, N,N-dimethylacetamide, N-methyl-2-pyrrolidone, γ-butyrolactone, γ-butyrolactam, and the like can be given. Of these, tetrahydrofuran, N,N-dimethylformamide, N,N-dimethylacetamide, and N-methyl-2-pyrrolidone are desirable. The polymerization solvent is desirably used after sufficiently drying.

The total concentration of the monomers in the polymerization solvent is usually 1 to 90 wt %, and desirably 5 to 40 wt %.

The polymerization temperature is usually 0 to 200° C., and desirably 50 to 120° C. The polymerization time is usually 0.5 to 100 hours, and desirably 1 to 40 hours.

The polymer shown by the general formula (1) is obtained by polymerizing 5 to 95 mol % of the monomer X and 5 to 95 mol % of the monomer Y (total amount of the monomers X and Y is 100 mol %). The polymer shown by the general formula (2) is obtained by polymerizing 5 to 95 mol % of the monomer Z and 5 to 95 mol % of the monomer Y (total amount of the monomers Z and Y is 100 mol %). The polymer shown by the general formula (3) is obtained by polymerizing 5 to 95 mol % of the monomer X, 5 to 90 mol % of the monomer Y, and 0.1 to 90 mol % of the monomer Z (total amount of the monomers X, Y, and Z is 100 mol %).

The sulfonic acid group-containing polymer used for the proton-conducting membrane of the present invention is obtained by introducing a sulfonic acid group into the polymers shown by the general formulas (1) and (2) and the polymer shown by the general formula (3) by using a sulfonating agent according to a conventional method.

In the present invention, the term "polymer is sulfonated" or "sulfonic acid group is introduced into the polymer" refers to the case where an aromatic ring of the polymer is replaced by a group such as —$SO_3H$, —($CH_2$)—$SO_3H$, or —($CF_2$)$_n$—$SO_3H$.

As a method of introducing a sulfonic acid group, one of the polymers shown by the general formulas (1), (2), and (3) may be sulfonated by using a conventional sulfonating agent such as sulfuric anhydride, fuming sulfuric acid, chlorosulfonic acid, sulfuric acid, or sodium hydrogensulfite under known conditions (see Polymer Preprints, Japan, Vol. 42, No. 3, p. 730 (1993); Polymer Preprints, Japan, Vol. 42, No. 3, p. 736 (1994); Polymer Preprints, Japan, Vol. 42, No. 7, pp. 2490 to 2492 (1993)).

Specifically, one of the polymers shown by the general formulas (1), (2), and (3) is caused to react with the sulfonating agent in the presence or absence of a solvent. As the solvent, hydrocarbon solvents such as n-hexane, ether solvents such as tetrahydrofuran and dioxane, polar aprotic solvents such as dimethylacetamide, dimethylformamide, and dimethylsulfoxide, halogenated hydrocarbons such as tetrachloroethane, dichloroethane, chloroform, and methylene chloride, and the like can be given. There are no specific limitations to the reaction temperature. The reaction temperature is usually −50 to 200° C., and desirably −10 to 100° C. The reaction time is usually 0.5 to 1,000 hours, and desirably 1 to 200 hours.

The amount of sulfonic acid groups in the sulfonic acid group-containing polymer obtained in this manner is 0.5 to 3.0 meq/g, and desirably 0.8 to 2.8 meq/g. If the amount is less than 0.5 meq/g, proton conductivity is not improved. If the amount exceeds 3.0 meq/g, the polymer becomes a water-soluble polymer, or durability of the polymer decreases even if the polymer stops short of becoming water-soluble, due to an increase in hydrophilicity.

The amount of sulfonic acid groups may be easily adjusted by changing the types and combination of the monomers.

The structure of the sulfonic acid group-containing polymer of the present invention may be confirmed by S=O absorption at 1,030 to 1,045 $cm^{-1}$ and 1,160 to 1,190 $cm^{-1}$, C—O—C absorption at 1,130 to 1,250 $cm^{-1}$, and C=O absorption at 1,640 to 1,660 $cm^{-1}$ in the infrared absorption spectrum, for example. The compositional ratio may be known by neutralization titration of sulfonic acid or elemental analysis. The structure of the polymer may be confirmed from the peak of aromatic protons at 6.8 to 8.0 ppm in the nuclear magnetic resonance spectrum ($^1$H-NMR).

Polymer Electrolyte

The solid polymer electrolyte of the present invention comprises a polymer obtained by sulfonating the polymer shown by the general formula (I) (hereinafter called "sulfonic acid group-containing polymer"). The proton-conducting membrane of the present invention comprises the above polymer electrolyte. When preparing the proton-conducting membrane from the sulfonic acid group-containing polymer, an inorganic acid such as sulfuric acid or phosphoric acid, an organic acid such as carboxylic acid, and an appropriate amount of water may be used in addition to the sulfonic acid group-containing polymer.

Proton-Conducting Membrane

The proton-conducting membrane of the present invention may be produced by dissolving the sulfonic acid group-containing polymer in a solvent to prepare a solution, casting the solution onto a substrate, and forming the solution in the shape of a film (casting method), for example. There are no specific limitations to the substrate insofar as the substrate is that used in a conventional solution casting method. For example, a substrate made of plastic or metal can be used. A substrate made of thermoplastic resin such as a polyethyleneterephthalate (PET) film is desirably used.

As the solvent for dissolving the sulfonic acid group-containing polymer, polar solvents such as N-methyl-2-pyrrolidone, N,N-dimethylformamide, γ-butyrolactone, N,N-dimethylacetamide, dimethyl sulfoxide, dimethylurea, dimethyl imidazolidinone, sulfolane, methylene chloride, chloroform, and tetrahydrofuran (THF) can be given. The solvent may be used either individually or in combination of two or more.

A mixture of the polar solvent and an alcohol may be used as the solvent for dissolving the sulfonic acid group-containing polymer. As the alcohol, methanol, ethanol, propyl alcohol, iso-propyl alcohol, sec-butyl alcohol, tert-butyl alcohol, and the like can be given. It is desirable to use methanol since methanol has an effect of reducing the solution viscosity over a wide compositional range. The alcohol may be used either individually or in combination of two or more.

In the case of using the mixture of the polar solvent and the alcohol as the solvent, a mixture having a composition in which the amount of the polar solvent is 95 to 25 wt %, and desirably 90 to 25 wt %, and the amount of the alcohol is 5 to 75 wt %, and desirably 10 to 75 wt % (100 wt % in total) is used. The mixture excels in the effect of reducing the solution viscosity by limiting the amount of alcohol within the above range.

The polymer concentration in the solution in which the sulfonic acid group-containing polymer is dissolved is usually 5 to 40 wt %, and desirably 7 to 25 wt %, although the polymer concentration varies depending on the molecular weight of the sulfonic acid group-containing polymer. If the polymer concentration is less than 5 wt %, it is difficult to increase the membrane thickness. Moreover, pinholes easily occur. If the polymer concentration exceeds 40 wt %, it is difficult to form a film due to an excessive increase in solution viscosity. Moreover, surface flatness and smoothness may be impaired.

The solution viscosity is usually 2,000 to 100,000 mPa·s, and desirably 3,000 to 50,000 mPa·s, although the viscosity varies depending on the molecular weight of the sulfonic acid group-containing polymer and the polymer concentration. If the solution viscosity is less than 2,000 mPa·s, the solution may flow from the substrate during film formation due to low retentivity. If the solution viscosity exceeds 100,000 mPa·s, the solution cannot be extruded from a die due to an excessive increase in viscosity, whereby it may be difficult to form a film using the casting method.

After forming the film, the organic solvent in the resulting undried film may be replaced by water by immersing the undried film in water. This reduces the amount of residual solvent in the resulting proton-conducting membrane.

The undried film may be pre-dried before immersing the undried film in water. The undried film is usually pre-dried at 50 to 150° C. for 0.1 to 10 hours.

The undried film may be immersed in water by using a batch method in which each sheet of the film is immersed in water, or a continuous method in which a laminated film formed on a substrate film (PET, for example) or a film removed from the substrate is immersed in water and wound.

The batch method has an advantage in that occurrence of wrinkles on the surface of the film can be reduced by putting the film to be treated in a frame.

The undried film is immersed in water so that the contact ratio of the undried film to water is 1 part by weight to 10 parts by weight or more, and desirably 30 parts by weight or more. It is desirable to increase the contact ratio as much as possible in order to reduce the amount of solvent remaining in the resulting proton-conducting membrane as much as possible. In order to reduce the amount of solvent remaining in the resulting proton-conducting membrane, it is also effective to maintain the organic solvent concentration in water equal to or lower than a predetermined concentration by replacing water used for immersion or causing the water to overflow. In order to reduce the surface distribution of the amount of organic solvent remaining in the proton-conducting membrane, it is effective to make the organic solvent concentration in water uniform by stirring the solvent or the like.

The temperature of water when immersing the undried film in water is desirably 5 to 80° C. The rate of substitution of the organic solvent by water is increased as the temperature of water is higher. However, since the amount of water absorption of the film is also increased, the surface state of the proton-conducting membrane obtained after drying may become coarse. The temperature of water is still more desirably 10 to 60° C. from the viewpoint of the rate of substitution and handling capability.

The immersion time is usually 10 minutes to 240 hours, although the immersion time varies depending on the initial amount of residual solvent, contact ratio, and treatment temperature. The immersion time is desirably 30 minutes to 100 hours.

A proton-conducting membrane in which the amount of residual solvent is reduced is obtained by immersing the undried film in water and drying the film as described above. The amount of residual solvent in the resulting proton-conducting membrane is usually 5 wt % or less.

The amount of residual solvent in the resulting proton-conducting membrane may be reduced to 1 wt % or less depending on the immersion conditions. For example, the contact ratio of the undried film to water is set at 1 part by weight to 50 parts by weight or more, the temperature of water during immersion is set at 10 to 60° C., and the immersion time is set at 10 minutes to 10 hours.

After immersing the undried film in water, the film is dried at 30 to 100° C., and desirably 50 to 80° C. for 10 to 180 minutes, and desirably 15 to 60 minutes. The film is then dried under vacuum at 50 to 150° C. and a reduced pressure of 500 to 0.1 mmHg for 0.5 to 24 hours to obtain a proton-conducting membrane.

The thickness of the proton-conducting membrane obtained by using the method of the present invention is usually 10 to 100 μm, and desirably 20 to 80 μm after drying.

The proton-conducting membrane of the present invention may include an aging preventive, desirably a hindered-phenol compound with a molecular weight of 500 or more. Durability of the proton-conducting membrane can be improved by using the aging preventive.

As the hindered-phenol compound with a molecular weight of 500 or more which can be used in the present invention, triethylene glycol-bis[3-(3-t-butyl-5-methyl-4-hydroxyphenyl)propionate] (trade name: IRGANOX 245),
1,6-hexanediol-bis[3-(3,5-di-t-butyl-4-hydroxyphenyl)propionate] (trade name: IRGANOX 259),
2,4-bis-(n-octylthio)-6-(4-hydroxy-3,5-di-t-butylanilino)-3,5-triazine (trade name: IRGANOX 565),
pentaerythrityl-tetrakis[3-(3,5-di-t-butyl-4-hydroxyphenyl)propionate] (trade name: IRGANOX 1010),
2,2-thio-diethylenebis[3-(3,5-di-t-butyl-4-hydroxyphenyl)propionate] (trade name: IRGANOX 1035),
octadecyl-3-(3,5-di-t-butyl-4-hydroxyphenyl)propionate (trade name: IRGANOX 1076),
N,N-hexamethylenebis(3,5-di-t-butyl-4-hydroxy-hydrocinnamide) (trade name: IRGAONOX 1098),
1,3,5-trimethyl-2,4,6-tris(3,5-di-t-butyl-4-hydroxybenzyl)benzene (trade name: IRGANOX 1330),
tris-(3,5-di-t-butyl-4-hydroxybenzyl)-isocyanurate (trade name: IRGANOX 3114),
3,9-bis[2-[3-(3-t-butyl-4-hydroxy-5-methylphenyl)propionyloxy]-1,1-dimethylethyl]-2,4,8,10-tetraoxaspiro[5.5]undecane (trade name: Sumilizer GA-80), and the like can be given.

In the present invention, the hindered-phenol compound with a molecular weight of 500 or more is desirably used in an amount of 0.01 to 10 parts by weight for 100 parts by weight of the sulfonic acid group-containing polymer.

The proton-conducting membrane of the present invention may be utilized as a proton-conducting membrane which can be used as an electrolyte for primary batteries, electrolyte for secondary batteries, solid polymer electrolyte for fuel cells, display devices, various sensors, signal transmission media, solid capacitors, ion-exchange membranes, and the like.

In the membrane electrode assembly of the present invention, the proton-conducting membrane is held between an oxygen electrode and a fuel electrode. Each of the oxygen electrode and the fuel electrode is in contact with a diffusion layer and the polymer electrolyte membrane on the side of a catalyst layer formed on the diffusion layer.

The diffusion layer is usually composed of carbon paper and an underlayer. The underlayer is formed by applying slurry, in which carbon black and polytetrafluoroethylene (PTFE) mixed at a predetermined weight ratio are uniformly dispersed in an organic solvent such as ethylene glycol, to one side of the carbon paper, and drying the applied slurry, for example.

The catalyst layer is formed by applying catalyst paste, in which catalyst particles prepared by causing platinum to be supported on carbon black at a predetermined weight ratio are uniformly mixed with an ion-conductive binder, to the underlayer, and drying the applied catalyst paste, for example.

The membrane electrode assembly is formed by hot-pressing the proton-conducting membrane in a state in which the proton-conducting membrane is held between the catalyst layers of the oxygen electrode and the fuel electrode.

The present invention is described below in more detail by way of examples. However, the present invention is not limited the following examples.

In the examples, a sulfonic acid equivalent, proton conductivity, hot water resistance (rate of weight change in film), and weight retention rate in a Fenton's test were determined as described below.

1. Sulfonic Acid Equivalent

The resulting sulfonic acid group-containing polymer was washed until the wash water became neutral. After removing the remaining free acid, the polymer was fully washed with water and dried. A predetermined amount of the polymer was weighed and titrated with an NaOH standard solution by using phenolphthalein dissolved in a THF/water mixed solvent as an indicator. The sulfonic acid equivalent was determined from the neutralization point.

2. Measurement of Proton Conductivity

Platinum lines (f=0.5 mm) were pressed against the surface of a proton-conducting membrane specimen in the shape of a strip with a width of 5 mm. The specimen was placed in a thermohygrostat, and the alternating-current resistance was determined by measuring the alternating-current impedance between the platinum lines. Specifically, the impedance at an alternating current of 10 kHz was measured at a temperature of 85° C. and a relative humidity of 90%. A chemical impedance measurement system manufactured by NF Corporation was used as a resistance measurement device. JW241 manufactured by Yamato Scientific Co., Ltd. was used as the thermohygrostat. Five platinum lines were pressed against the specimen at an interval of 5 mm, and the alternating-current resistance was measured while changing the distance between the lines to 5 to 20 mm. The specific resistance of the membrane was calculated from the distance between the lines and the resistance gradient. The alternating-current impedance was calculated from the reciprocal of the specific resistance, and the proton conductivity was calculated from the impedance.

Specific resistance $R$ (Ω·cm)=0.5 (cm)×membrane thickness (cm)×resistance gradient between lines (Ω/cm)

3. Hot Water Resistance

A proton-conducting membrane specimen in the shape of a film was immersed in ion-exchanged water. The weight retention rate of the film before and after immersion at 95° C. for 48 hours was calculated by using the following numerical formula. The weight of the film was determined after absolutely drying the film under vacuum.

Weight retention rate (%) in hot water resistance test=weight of film after hot water resistance test/weight of film before hot water resistance test×100

4. Fenton's Test

A Fenton's reagent was prepared by mixing iron sulfate heptahydrate with 3 wt % of hydrogen peroxide so that the concentration of the iron ion was 20 ppm. 200 g of the Fenton's reagent was collected in a polyethylene container (250 cc). A proton-conducting membrane cut at a dimension of 3 cm×4 cm and a thickness of 55 μm was placed in the container and sealed therein. The container was immersed in a thermostat at 40° C. and subjected to a Fenton's test for 30 hours.

The weight retention rate after 30 hours of the Fenton's test was calculated by using the following numerical formula. The weight of the film was determined after absolutely drying the film under vacuum.

Weight retention rate (%) in Fenton's test=weight of film after Fenton's test/weight of film before Fenton's test×100

The proton-conducting membrane used for the above property measurement was prepared as described below.

A sulfonated polymer was dissolved in a solvent so that the solid content of the sulfonated polymer was about 10 wt %. The resulting polymer varnish was applied to a glass substrate using a doctor blade, and pre-dried at 75° C. for one hour by using an oven. The pre-dried film was removed from the glass substrate. The film was secured to an aluminum plate by using a heat-resistant tape, and dried at 150° C. for one hour by using an oven. The dried film was immersed in ion-exchanged water in an amount about 1,000 times the weight of the film at 25° C. for two hours in order to completely remove the solvent remaining in the film. The resulting film was allowed to stand at a temperature of 25° C. and a relative humidity of 50% for 12 hours. The properties of the film were then measured.

EXAMPLE 1

A flask was charged with 13.9 g (32 mmol) of 2,5-dichloro-4'-(4-phenoxy)phenoxybenzophenone, 25.4 g (48 mmol) of a compound shown by the following formula (y-1)', 1.56 g (10.4 mmol) of sodium iodide, 8.39 g (32 mmol) of triphenylphosphine, 12.6 g (192 mmol) of zinc, and 1.57 g (2.4 mmol) of bis(triphenylphosphine)nickel dichloride. The atmosphere inside the flask was replaced by dry nitrogen. After the addition of 100 ml of N-methyl-2-pyrrolidone (NMP), the mixture was heated at 70° C. and stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 32 g (95%) of a base polymer. The number average molecular weight and the weight average molecular weight of the polymer determined by GPC were respectively 29,400 and 60,500. It was presumed that the resulting base polymer had a structure shown by the following formula (4). In the formula (4), a and b are integers of two or more.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The polymer was then dried to obtain 37 g (96%) of a sulfonated polymer.

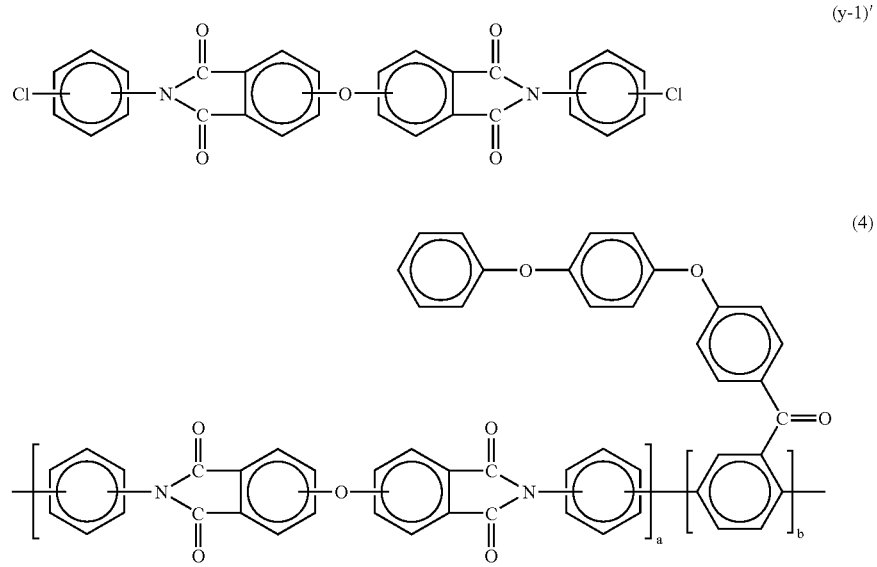

EXAMPLE 2

A base polymer was produced in the same manner as in Example 1 except for using 30.1 g (48 mmol) of a compound shown by the following formula (y-2)' instead of the compound shown by the formula (y-1)'. It was presumed that the resulting base polymer had a structure shown by the following formula (5). In the formula (5), a and b are integers of two or more. The resulting base polymer was sulfonated to obtain 41 g (94%) of a sulfonated polymer with a number average molecular weight and a weight average molecular weight determined by GPC of 47,200 and 144,900, respectively.

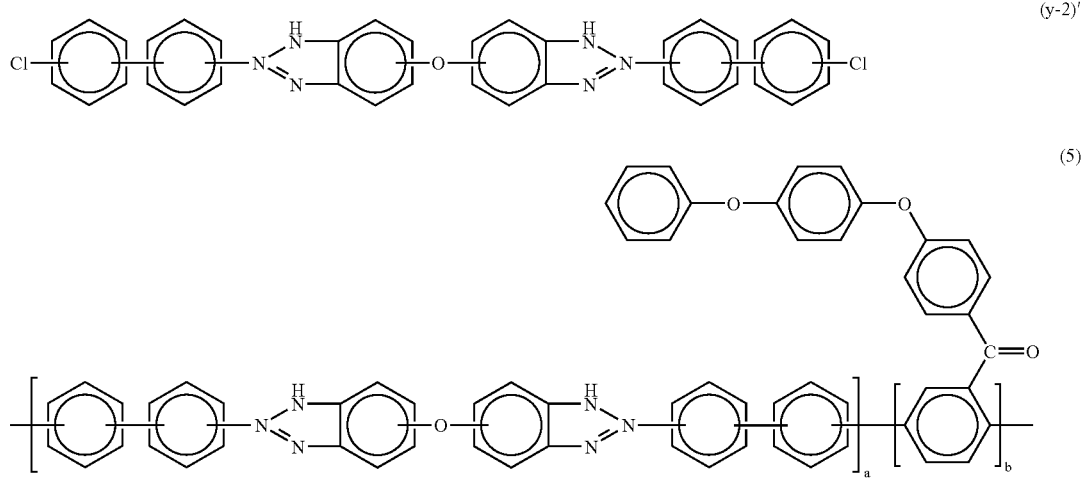

EXAMPLE 3

A base polymer was produced in the same manner as in Example 1 except for using 28.5 g (48 mmol) of a compound shown by the following formula (y-3)' instead of the compound shown by the formula (y-1)'. It was presumed that the resulting base polymer had a structure shown by the following formula (6). In the formula (6), a and b are integers of two or more. The resulting base polymer was sulfonated to obtain 39 g (93%) of a sulfonated polymer with a number average molecular weight and a weight average molecular weight determined by GPC of 36,400 and 108,000, respectively.

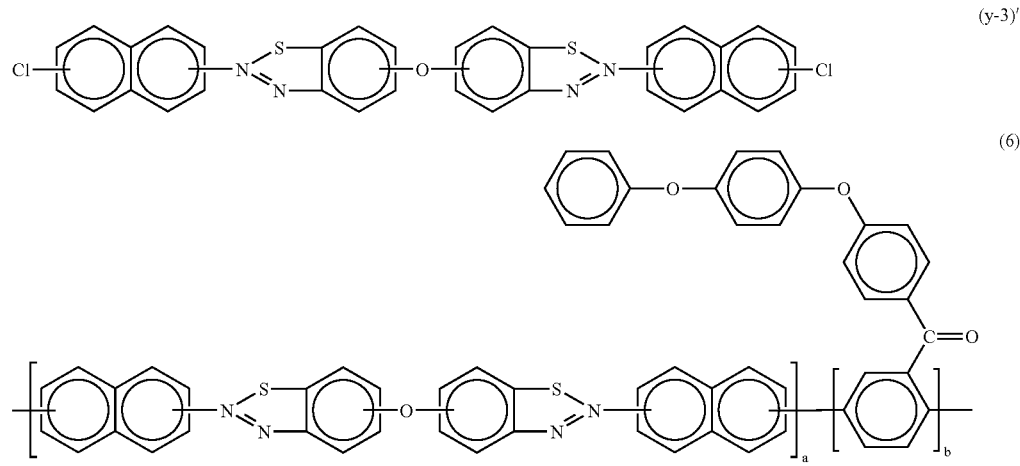

EXAMPLE 4

A flask was charged with 26.1 g (60 mmol) of 2,5-dichloro-4'-(4-phenoxy)phenoxybenzophenone, 8.2 g (17.6 mmol) of a compound shown by the following formula (y-4)', 26.9 g (2.4 mmol) of a compound shown by the following formula (z-1)' (number average molecular weight: 11,200), 1.56 g (10.4 mmol) of sodium iodide, 8.39 g (32 mmol) of triphenylphosphine, 12.6 g (192 mmol) of zinc, and 1.57 g (2.4 mmol) of bis(triphenylphosphine)nickel dichloride. The atmosphere inside the flask was replaced by dry nitrogen. After the addition of 100 ml of N-methyl-2-pyrrolidone (NMP), the mixture was heated at 70° C. and stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 35 g (95%) of a base polymer. It was presumed that the resulting base polymer had a structure shown by the following formula (7). In the formula (7), a, b, and c are integers of two or more. The number average molecular weight and the weight average molecular weight of the polymer determined by GPC were respectively 46,800 and 146,800.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The resulting polymer was then dried to obtain 25 g (96%) of a sulfonated polymer.

The properties of the sulfonated polymers obtained in Examples 1 to 4 are shown in Table 1.

TABLE 1

| Evaluation item | Unit | Example 1 | Example 2 | Example 3 | Example 4 |
|---|---|---|---|---|---|
| Sulfonic acid group equivalent | meq/g | 1.5 | 1.6 | 1.5 | 1.8 |
| Proton conductivity | S/cm | 0.095 | 0.103 | 0.103 | 0.103 |
| Hot water resistance | Weight retention rate (%) | 40 | 50 | 55 | 55 |
| Fenton's reagent resistance | Weight retention rate (%) | 3 | 3 | 5 | 5 |

EXAMPLE 5

A flask was charged with 15.7 g (36 mmol) of 2,5-dichloro-4'-(4-phenoxy)phenoxybenzophenone, 30.7 g (44 mmol) of a compound shown by the following formula (y-5)', 1.56 g (10.4 mmol) of sodium iodide, 8.39 g (32 mmol) of triphenylphosphine, 12.6 g (192 mmol) of zinc, and 1.57 g (24 mmol) of bis(triphenylphosphine)nickel dichloride. The atmosphere inside the flask was replaced by dry nitrogen. After the addition of 100 ml of N-methyl-2-pyrrolidone (NMP), the mixture was heated at 70° C. and

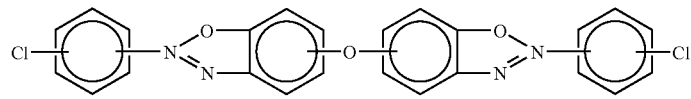

(y-4)'

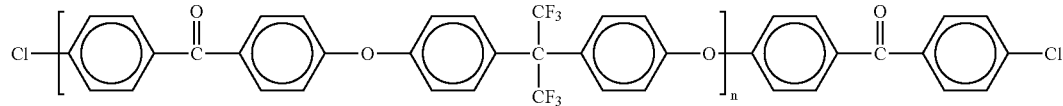

(z-1)'

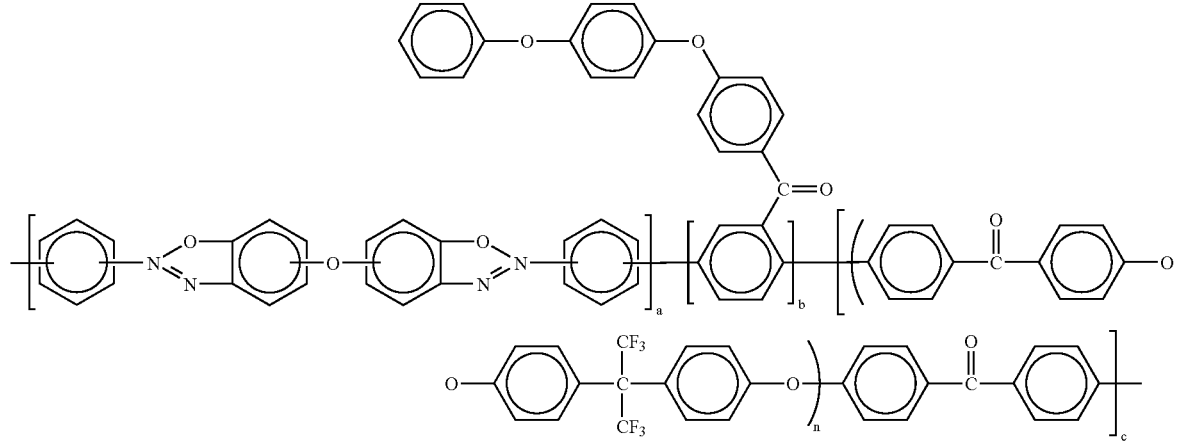

7 stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 35 g (95%) of a base polymer. The number average molecular weight and the weight average molecular weight of the polymer determined by GPC were respectively 29,400 and 60,500. It was presumed that the resulting base polymer had a structure shown by the following formula (8). In the formula (8), a and b are integers of two or more.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The polymer was then dried to obtain 45 g (96%) of a sulfonated polymer.

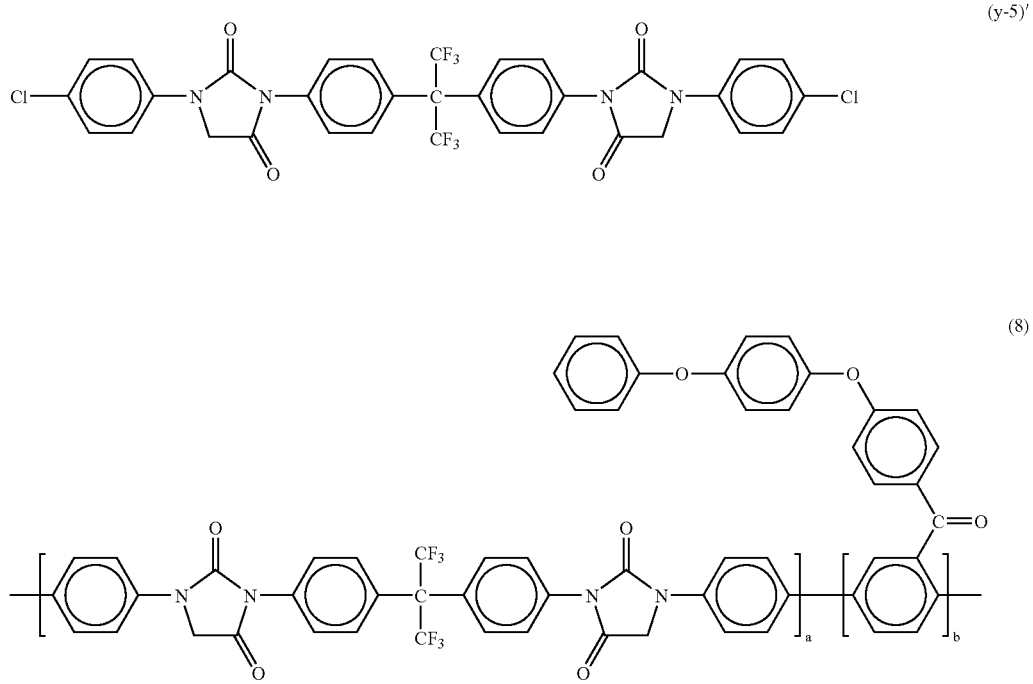

EXAMPLE 6

A base polymer was produced in the same manner as in Example 5 except for using 18.6 g (58 mmol) of a compound shown by the following formula (y-6)' instead of the compound shown by the formula (y-5)' and using 9.8 g (22 mmol) of 2,5-dichloro-4'-(4-phenoxy)phenoxybenzophenone. It was presumed that the resulting base polymer had a structure shown by the following formula (9). In the formula (9), a and b are integers of two or more. The resulting base polymer was sulfonated to obtain 24 g (92%) of a sulfonated polymer with a number average molecular weight and a weight average molecular weight determined by GPC of 35,600 and 112,000, respectively.

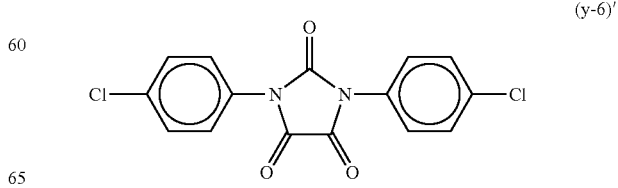

-continued (9)

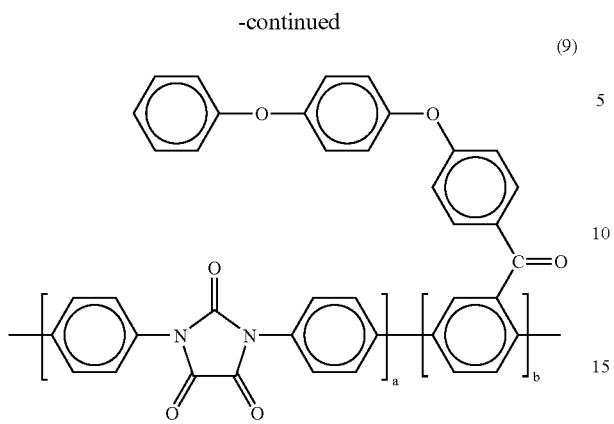

(10)

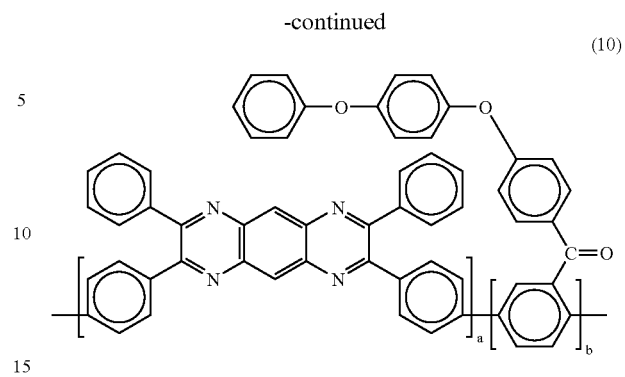

EXAMPLE 7

A base polymer was produced in the same manner as in Example 5 except for using 22.2 g (40 mmol) of a compound shown by the following formula (y-7)' instead of the compound shown by the formula (y-5)' and using 17.4 g (40 mmol) of 2,5-dichloro-4'-(4-phenoxy)phenoxybenzophenone. It was presumed that the resulting base polymer had a structure shown by the following formula (10). In the formula (10), a and b are integers of two or more. The resulting base polymer was sulfonated to obtain 39 g (96%) of a sulfonated polymer with a number average molecular weight and a weight average molecular weight determined by GPC of 31,800 and 107,000, respectively.

(y-7)'

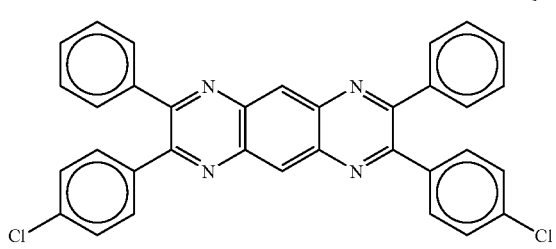

EXAMPLE 8

A flask was charged with 27.9 g (64 mmol) of 2,5-dichloro-4'-(4-phenoxy)phenoxybenzophenone, 4.0 g (13.6 mmol) of a compound shown by the following formula (y-8)', 26.9 g (2.4 mmol) of a compound shown by the following formula (z-2)' (number average molecular weight: 11,200), 1.56 g (10.4 mmol) of sodium iodide, 8.39 g (32 mmol) of triphenylphosphine, 12.6 g (192 mmol) of zinc, and 1.57 g (24 mmol) of bis(triphenylphosphine)nickel dichloride. The atmosphere inside the flask was replaced by dry nitrogen. After the addition of 100 ml of N-methyl-2-pyrrolidone (NMP), the mixture was heated at 70° C. stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 35 g (95%) of a base polymer. It was presumed that the resulting base polymer had a structure shown by the following formula (11). In the formula (11), a, b, and c are integers of two or more. The number average molecular weight and the weight average molecular weight of the polymer determined by GPC were respectively 47,800 and 150,100.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The resulting polymer was then dried to obtain 57 g (94%) of a sulfonated polymer.

(y-8)'

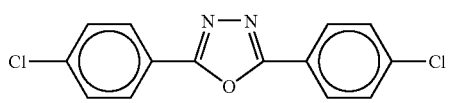

-continued

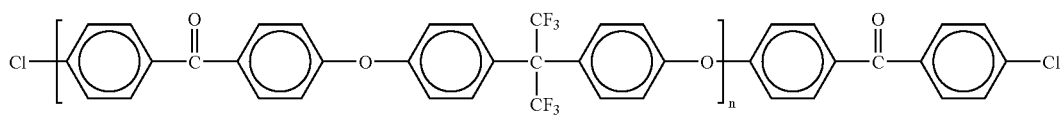

(z-2)'

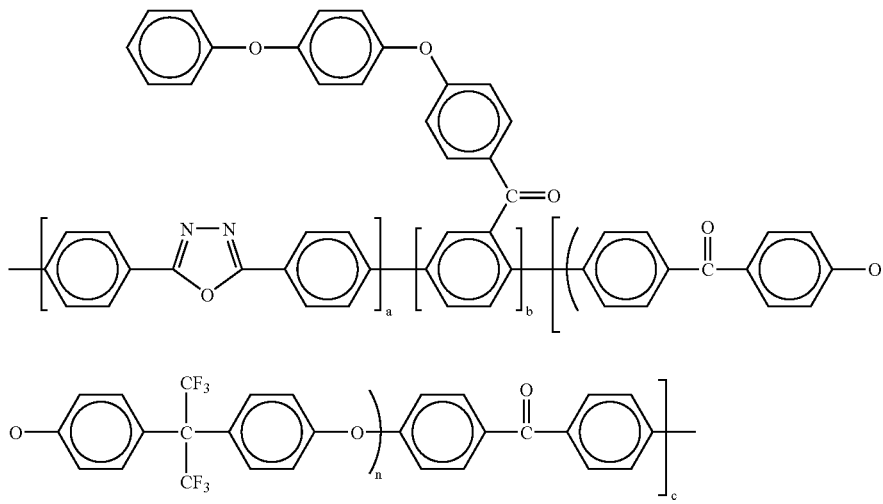

(11)

The properties of the sulfonated polymers obtained in Examples 5 to 8 are shown in Table 2.

TABLE 2

| Evaluation item | Unit | Example | | | |
|---|---|---|---|---|---|
| | | 5 | 6 | 7 | 8 |
| Sulfonic acid group equivalent | meq/g | 1.5 | 1.6 | 1.8 | 1.8 |
| Proton conductivity | S/cm | 0.095 | 0.103 | 0.103 | 0.103 |
| Hot water resistance | Weight retention rate (%) | 52 | 45 | 60 | 70 |
| Fenton's reagent resistance | Weight retention rate (%) | 10 | 2 | 10 | 15 |

EXAMPLE 9

A flask was charged with 17.4 g (40 mmol) of 2,5-dichloro-4'-(4-phenoxy)phenoxybenzophenone, 23.6 g (40 mmol) of a compound shown by the following formula (y-9)' (number average molecular weight: 589), 1.56 g (10.4 mmol) of sodium iodide, 8.39 g (32 mmol) of triphenylphosphine, 12.6 g (192 mmol) of zinc, and 1.57 g (24 mmol) of bis(triphenylphosphine)nickel dichloride. The atmosphere inside the flask was replaced by dry nitrogen. After the addition of 100 ml of N-methyl-2-pyrrolidone (NMP), the mixture was heated at 70° C. and stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 35 g (95%) of a base polymer. The number average molecular weight and the weight average molecular weight of the polymer determined by GPC were respectively 29,400 and 60,500. It was presumed that the resulting base polymer had a structure shown by the following formula (12). In the formula (12), a and b are integers of two or more.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The polymer was then dried to obtain 39 g (94%) of a sulfonated polymer.

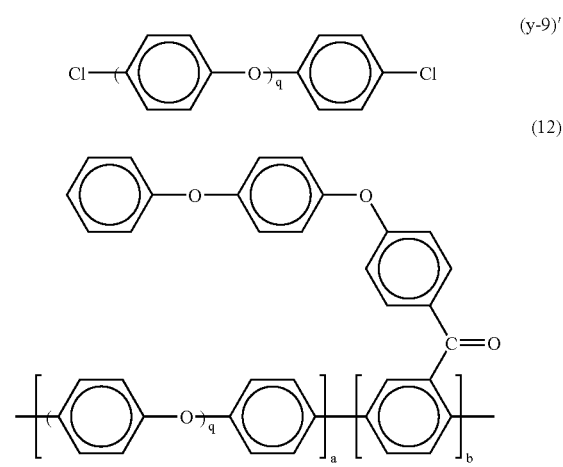

(y-9)'

(12)

EXAMPLE 10

A base polymer was produced in the same manner as in Example 9 except for using 26.8 g (16 mmol) of a compound shown by the following formula (y-10)' (number average molecular weight: 1,675) instead of the compound shown by the formula (y-9)' and using 27.9 g (64 mmol) of 2,5-dichloro-4'-(4-phenoxy)phenoxybenzophenone. It was presumed that the resulting base polymer had a structure shown by the following formula (13). In the formula (13), a and b are integers of two or more. The resulting base polymer was sulfonated to obtain 55 g (93%) of a sulfonated polymer with a number average molecular weight and a weight average molecular weight determined by GPC of 35,100 and 103,200, respectively.

EXAMPLE 11

A flask was charged with 29.6 g (68 mmol) of 2,5-dichloro-4'-(4-phenoxy)phenoxybenzophenone, 9.2 g (9.6 mmol) of a compound shown by the following formula (y-11)' (number average molecular weight: 960), 26.9 g (2.4 mmol) of a compound shown by the following formula (z-3)' (number average molecular weight: 11,200), 1.56 g (10.4 mmol) of sodium iodide, 8.39 g (32 mmol) of triphenylphosphine, 12.6 g (192 mmol) of zinc, and 1.57 g (24 mmol) of bis(triphenylphosphine)nickel dichloride. The atmosphere inside the flask was replaced by dry nitrogen. After the addition of 100 ml of N-methyl-2-pyrrolidone (NMP), the mixture was heated at 70° C. and stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 35 g (95%) of a base polymer. It was presumed that the resulting base polymer had a structure shown by the following formula (14). In the formula (14), a, b, and c are integers of two or more. The number average molecular weight and the weight average molecular weight of the polymer determined by GPC were respectively 45,000 and 133,700.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The resulting polymer was then dried to obtain 60 g (96%) of a sulfonated polymer.

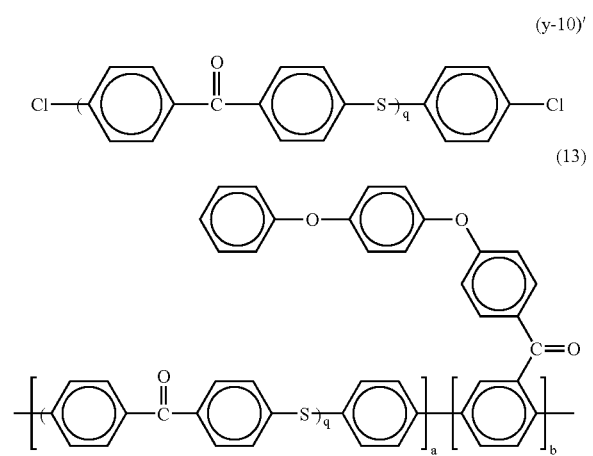

(y-10)'

(13)

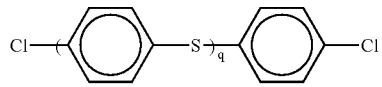

(y-11)'

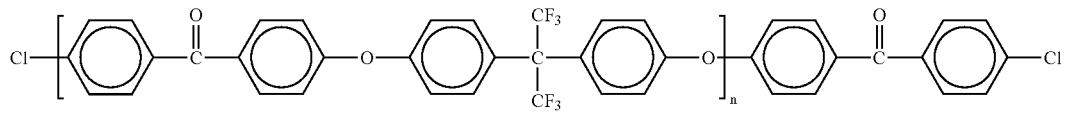

(z-3)'

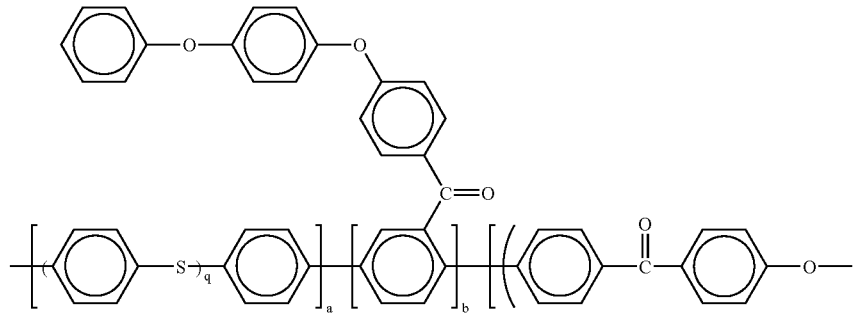

(14)

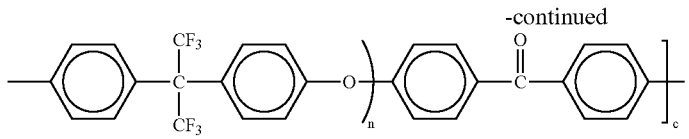
-continued

The properties of the sulfonated polymers obtained in Examples 9 to 11 are shown in Table 3.

TABLE 3

| Evaluation item | Unit | Example 9 | Example 10 | Example 11 |
|---|---|---|---|---|
| Sulfonic acid group equivalent | meq/g | 1.5 | 1.6 | 1.8 |
| Proton conductivity | S/cm | 0.083 | 0.092 | 0.094 |
| Hot water resistance | Weight retention rate (%) | 45 | 52 | 60 |
| Fenton's reagent resistance | Weight retention rate (%) | 10 | 8 | 12 |

EXAMPLE 12

A flask was charged with 22.2 g (76 mmol) of a compound shown by the following formula (y-12)', 44.8 g (4 mmol) of a compound shown by the following formula (x-1)' (number average molecular weight: 11,200), 1.56 g (10.4 mmol) of sodium iodide, 8.39 g (32 mmol) of triphenylphosphine, and 12.6 g (192 mmol) of zinc. The atmosphere inside the flask was replaced by dry nitrogen. After the addition of 100 ml of N-methyl-2-pyrrolidone (NMP), the mixture was heated at 70° C. and stirred for three hours to be polymerized. The reaction solution was poured into 3,000 ml of a mixed solution of methanol and concentrated hydrochloric acid (volume ratio: 9:1) to coagulate and precipitate the product. The precipitate was filtered, washed with methanol, and dried under vacuum to obtain 35 g (95%) of a base polymer. It was presumed that the resulting base polymer had a structure shown by the following formula (15). In the formula (15), a and b are integers of two or more. The number average molecular weight and the weight average molecular weight of the polymer determined by GPC were respectively 29,800 and 93,700.

After the addition of 200 ml of concentrated sulfuric acid with a concentration of 98.5 wt % to 20 g of the resulting base polymer, the mixture was stirred at 60° C. for five hours. The reaction solution was poured into water to precipitate the polymer. The polymer was repeatedly washed until the pH of the wash water was 5.0. The resulting polymer was then dried to obtain 23 g (96%) of a sulfonated polymer.

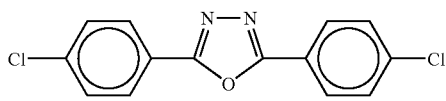

(y-12)'

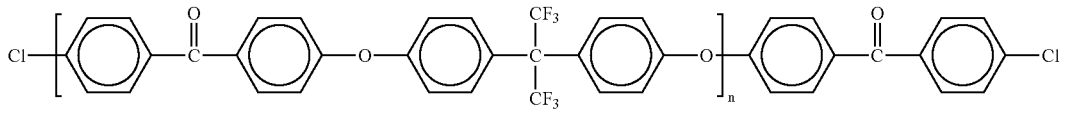

(x-1)'

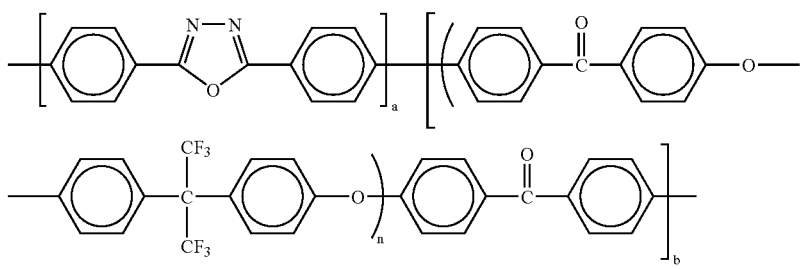

(15)

EXAMPLE 13

A base polymer was produced in the same manner as in Example 12 except for using 45.7 g (71.2 mmol) of a compound shown by the following formula (y-13)' instead of the compound shown by the formula (y-12)' and using 98.56 g (8.8 mmol) of the compound shown by the formula (x-1)'. It was presumed that the resulting base polymer had a structure shown by the following formula (16). In the formula (16), a and b are integers of two or more. The resulting base polymer was sulfonated to obtain 22 g (96%) of a sulfonated polymer with a number average molecular weight and a weight average molecular weight determined by GPC of 38,500 and 113,000, respectively.

(y-13)'

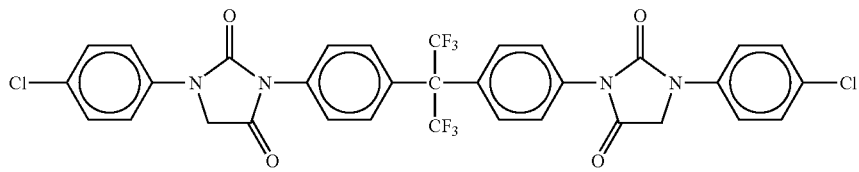

(16)

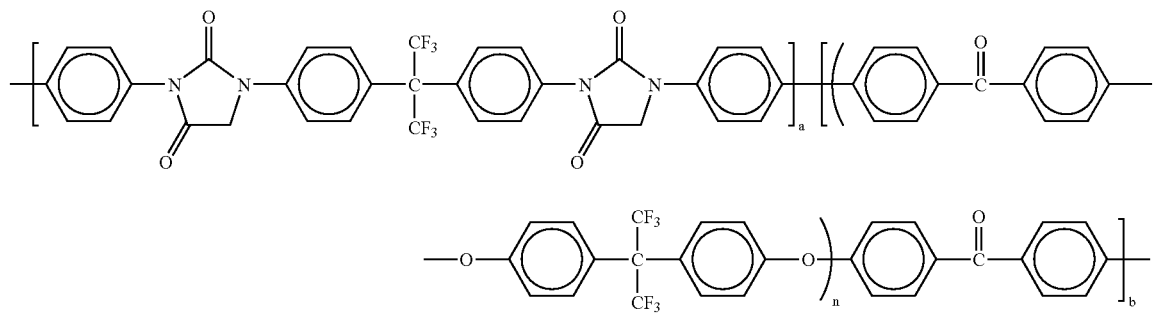

EXAMPLE 14

A base polymer was produced in the same manner as in Example 12 except for using 46.0 g (72 mmol) of a compound shown by the following formula (y-14)' instead of the compound shown by the formula (y-12)' and using 89.6 g (8 mmol) of the compound shown by the formula (x-1)'. It was presumed that the resulting base polymer had a structure shown by the following formula (17). In the formula (17), a and b are integers of two or more. The resulting base polymer was sulfonated to obtain 22 g (95%) of a sulfonated polymer with a number average molecular weight and a weight average molecular weight determined by GPC of 39,400 and 128,300, respectively.

(y-14)'

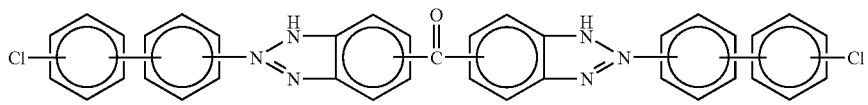

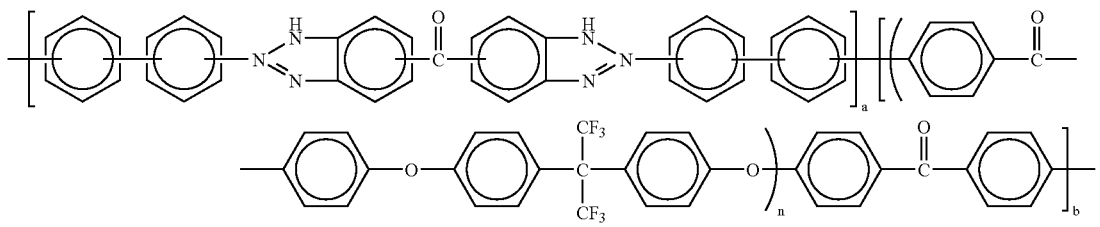

(17)

The properties of the sulfonated polymers obtained in Examples 12 to 14 are shown in Table 4.

TABLE 4

| Evaluation item | Unit | Example 12 | Example 13 | Example 14 |
|---|---|---|---|---|
| Sulfonic acid group equivalent | meq/g | 1.6 | 1.5 | 1.6 |
| Proton conductivity | S/cm | 0.103 | 0.103 | 0.103 |
| Hot water resistance | Weight retention rate (%) | 30 | 40 | 35 |
| Fenton's reagent resistance | Weight retention rate (%) | 6 | 2 | 10 |

As is clear from Tables 1 to 4, according to the present invention, a sulfonic acid group-containing polymer which can be used for a solid polymer electrolyte membrane excelling in hot water resistance and radical resistance (durability) can be provided. A proton-conducting membrane comprising the polymer electrolyte of the present invention can be suitably used as a highly durabile proton-conducting membrane for fuel cells.

EXAMPLE 15

A proton-conducting membrane including the polymer electrolyte obtained in Examples 1 to 14 was held between an oxygen electrode and a fuel electrode, and hot-pressed at 80 to 180° C. and 5 MPa for two minutes. The proton-conducting membrane was hot-pressed several times under the above conditions to obtain a membrane electrode assembly.

Electricity was generated by using the membrane electrode assembly as a unit cell by supplying air to the oxygen electrode and pure hydrogen to the fuel electrode to measure the cell potential at a current density of 0.2 A/cm². The power generation conditions for both electrodes were set at a pressure of 100 kPa, a utilization factor of 50%, a relative humidity of 50%, and a temperature of 85° C. As a result, an excellent power generation performance was obtained. The oxygen electrode and the fuel electrode were manufactured as follows.

Carbon black and polytetrafluoroethylene (PTFE) particles were mixed at a weight ratio of 4:6, and uniformly dispersed in ethylene glycol to prepare slurry. The slurry was applied to one side of carbon paper and dried to form an underlayer. A diffusion layer consisting of the carbon paper and the underlayer was thus obtained.

Catalyst particles prepared by causing platinum particles to be supported on carbon black (furnace black) at a weight ratio of 1:1 were mixed with an ion-conductive binder at a weight ratio of 8:5, and uniformly dispersed to prepare catalyst paste. In this example, the above polymer electrolyte was used as the ion-conductive binder. A solution of a commercially available perfluoroalkylsulfonic acid polymer compound (NAFION (trade name) manufactured by DuPont, for example) may be used as the ion-conductive binder.

The catalyst paste was screen-printed on the underlayer of the diffusion layer so that the amount of platinum was 0.5 mg/cm². The catalyst paste was dried at 60° C. for 10 minutes and dried at 120° C. under reduced pressure to obtain the oxygen electrode and the fuel electrode.

The resulting membrane electrode assembly showed excellent electrical properties.

What is claimed is:

1. A polymer electrolyte comprising a sulfonated product of a polymer shown by the following general formula (I):

(I)

wherein X represents at least one structure selected from structures shown by the following formulas (X-1), (X-2), and (X-3), Y represents at least one structure selected from structures shown by the following formulas (Y-1) to (Y-12), Z represents at least one structure selected from structures shown by the following formulas (Z-1) and (Z-2), X, Y, and Z being bonded randomly, alternately, or in blocks, y represents an integer of two or more, and each of x and z represents an integer of zero or more, where x+z>2,

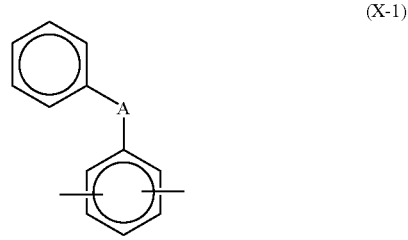

(X-1)

-continued

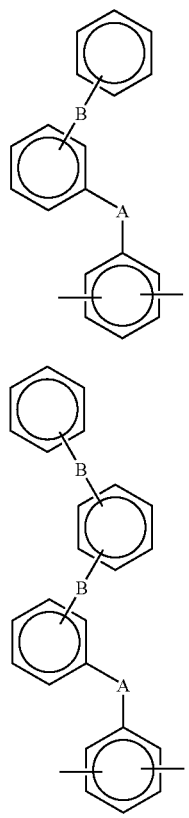
(X-2)

(X-3)

wherein A represents an electron-withdrawing group, and B represents an electron-donating group,

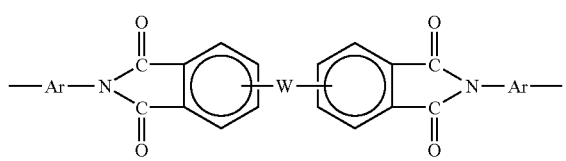
(Y-1)

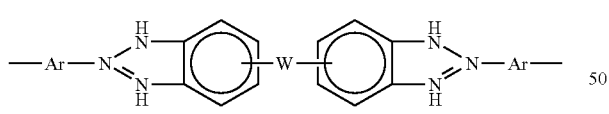
(Y-2)

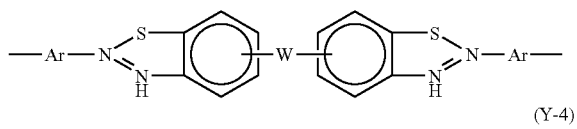
(Y-3)

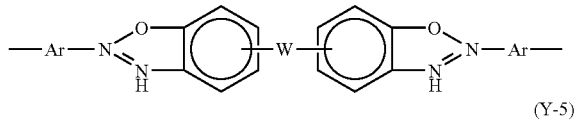
(Y-4)

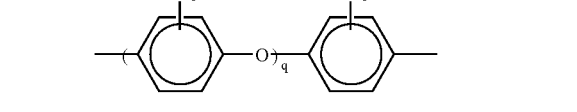
(Y-5)

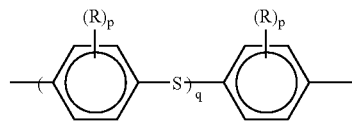
(Y-6)

(Y-7)

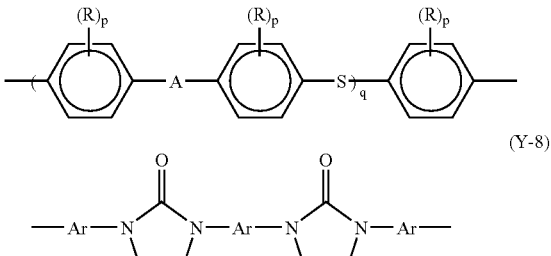
(Y-8)

(Y-9)

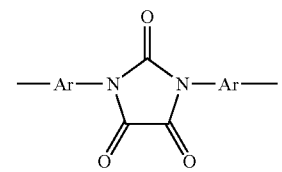
(Y-10)

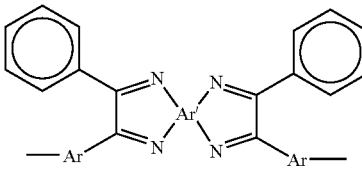
(Y-11)

(Y-12)

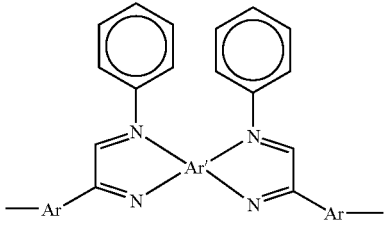

wherein A represents an electron-withdrawing group, Ar represents a divalent group including an aromatic ring, Ar' represents a tetravalent group including an aromatic ring, R represents a hydrogen atom or a hydrocarbon group, W represents an electron-withdrawing group or an electron-donating group, p represents an integer of 0 to 4, and q represents an integer of 1 to 1000,

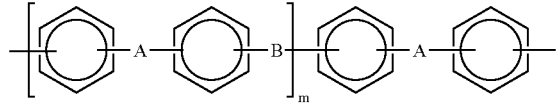
(z-1)

-continued

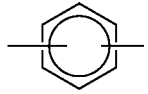
(z-2)

wherein A represents an electron-withdrawing group, B represents an electron-donating group, and m represents an integer of 0 to 200.

2. The polymer electrolyte as defined in claim 1, comprising a sulfonated product of a polymer shown by the following general formula (1):

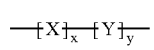
(1)

wherein X represents at least one structure selected from the structures shown by the formulas (X-1), (X-2), and (X-3), Y represents at least one structure selected from the structures shown by the formulas (Y-1) to (Y-12), X and Y being bonded randomly, alternately, or in blocks, and each of x and y represents an integer of two or more.

3. The polymer electrolyte as defined in claim 1, comprising a sulfonated product of a polymer shown by the following general formula (2):

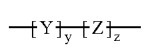
(2)

wherein X represents at least one structure selected from the structures shown by the formulas (Y-1) to (Y-12), Z represents at least one structure selected from the structures shown by the formulas (Z-1) and (Z-2), Y and Z being bonded randomly, alternately, or in blocks, and each of y and z represents an integer of two or more.

4. The polymer electrolyte as defined in claim 1, comprising a sulfonated product of a polymer shown by the following general formula (3):

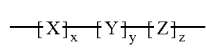
(3)

wherein X represents at least one structure selected from the structures shown by the formulas (X-1), (X-2), and (X-3), Y represents at least one structure selected from the structures shown by the formulas (Y-1) to (Y-12), Z represents at least one structure selected from the structures shown by the formulas (Z-1) and (Z-2), X, Y, and Z being bonded randomly, alternately, or in blocks, and each of x, y, and z represents an integer of two or more.

5. The polymer electrolyte as defined in claim 1, comprising a sulfonic acid group in an amount of 0.5 to 3.0 meq/g.

6. The polymer electrolyte as defined in claim 2, comprising a sulfonic acid group in an amount of 0.5 to 3.0 meq/g.

7. The polymer electrolyte as defined in claim 3, comprising a sulfonic acid group in an amount of 0.5 to 3.0 meq/g.

8. The polymer electrolyte as defined in claim 4, comprising a sulfonic acid group in an amount of 0.5 to 3.0 meq/g.

9. A proton-conducting membrane comprising the polymer electrolyte as defined in claim 1.

10. A proton-conducting membrane comprising the polymer electrolyte as defined in claim 5.

11. A membrane electrode assembly comprising a pair of electrodes and an electrolyte membrane held between the electrodes, the electrodes and the electrolyte membrane being integrally bonded, wherein the electrolyte membrane comprises a polymer shown by the following general formula (I):

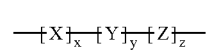
(I)

wherein X represents at least one structure selected from structures shown by the following formulas (X-1), (X-2), and (X-3), Y represents at least one structure selected from structures shown by the following formulas (Y-1) to (Y-12), Z represents at least one structure selected from structures shown by the following formulas (Z-1) and (Z-2), X, Y, and Z being bonded randomly, alternately, or in blocks, y represents an integer of two or more, and each of x and z represents an integer of zero or more, where x+z>2,

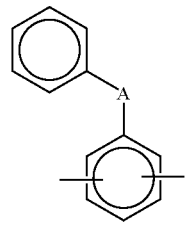
(X-1)

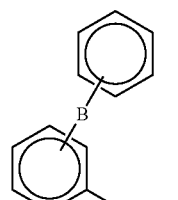
(X-2)

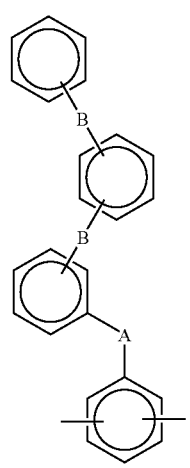
(X-3)

wherein A represents an electron-withdrawing group, and B represents an electron-donating group,

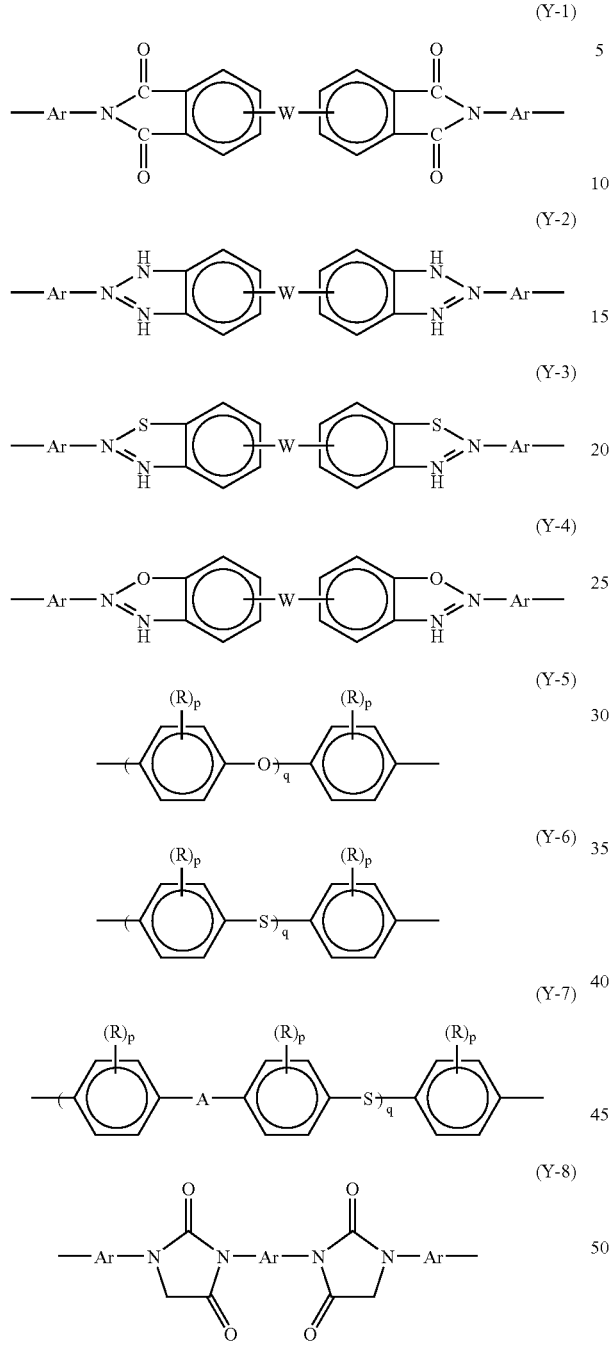
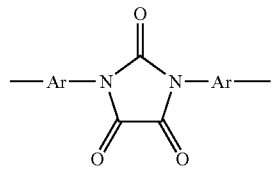
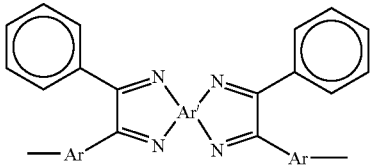
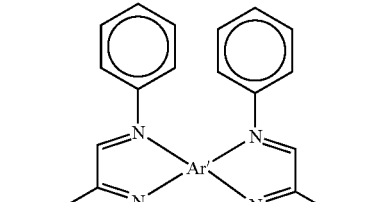
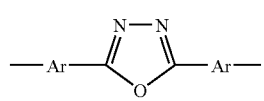

wherein A represents an electron-withdrawing group, Ar represents a divalent group including an aromatic ring, Ar' represents a tetravalent group including an aromatic ring, R represents a hydrogen atom or a hydrocarbon group, W represents an electron-withdrawing group or an electron-donating group, p represents an integer of 0 to 4, and q represents an integer of 1 to 1000,

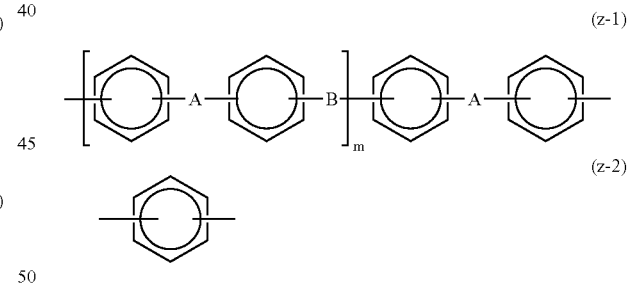

wherein A represents an electron-withdrawing group, B represents an electron-donating group, and m represents an integer of 0 to 200.

* * * * *